(12) United States Patent
Wenstrup et al.

(10) Patent No.: US 7,454,817 B2
(45) Date of Patent: Nov. 25, 2008

(54) HEAT AND FLAME SHIELD

(75) Inventors: David E. Wenstrup, Greer, SC (US); Gregory J. Thompson, Simpsonville, SC (US); Jason G. Chay, Easley, SC (US); Ty G. Dawson, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 130 days.

(21) Appl. No.: 11/713,147

(22) Filed: Mar. 2, 2007

(65) Prior Publication Data

US 2008/0054231 A1 Mar. 6, 2008

Related U.S. Application Data

(60) Division of application No. 11/123,337, filed on May 6, 2005, now Pat. No. 7,229,938, which is a continuation-in-part of application No. 10/841,148, filed on May 7, 2004, now Pat. No. 7,153,794.

(51) Int. Cl.
*D04H 1/04* (2006.01)
*D04H 1/70* (2006.01)

(52) U.S. Cl. .......................... 19/302; 19/145.5; 28/100; 156/62.2

(58) Field of Classification Search .................. 28/100, 28/103, 101, 158; 19/145.5, 145.7, 302, 19/303, 307, 306, 304, 296, 308; 156/62.6, 156/62.8, 62.4, 62.2, 148; 264/112, 113, 264/122, 114, 517, 518, 121; 162/129, 141, 162/149, 153, 146

See application file for complete search history.

(56) References Cited

U.S. PATENT DOCUMENTS 2,825,389 A * 3/1958 Stephens .................... 264/122
2,993,239 A * 7/1961 Heritage ...................... 19/302
3,073,735 A 1/1963 Till et al. ...................... 156/38
3,158,668 A * 11/1964 Johnson ........................ 19/305
3,256,569 A * 6/1966 Draving ........................ 19/300
3,740,797 A 6/1973 Farrington ................. 19/156.3
3,772,739 A 11/1973 Lovgren .................... 19/156.3
3,837,995 A 9/1974 Floden ........................ 161/150
4,018,646 A 4/1977 Ruffo et al. ................. 162/146
4,082,886 A 4/1978 Butterworth et al. ........ 428/284
4,127,698 A 11/1978 Shimizu et al. ............. 428/373
4,194,037 A 3/1980 Stoller .......................... 429/92
4,435,468 A 3/1984 TenEyck ..................... 428/285
4,863,797 A 9/1989 Ichibori et al. .............. 428/359

(Continued)

FOREIGN PATENT DOCUMENTS

EP 0622332 11/1994

(Continued)

*Primary Examiner*—Amy B Vanatta
(74) *Attorney, Agent, or Firm*—Cheryl J. Brickey

(57) ABSTRACT

A heat and fire resistant planar unitary shield formed of heat and flame resistant fibers and voluminous bulking fibers. The shield material has a heat and flame resistant zone with a majority of the heat and flame resistant fibers, and a voluminous bulking zone with a majority of the voluminous bulking fibers. The fibers are distributed through the shield material in an manner that the heat and flame resistant fibers collect closest to the outer surface of the shield with the heat and flame resistant zone, and the voluminous bulking fibers collect closest to the outer surface of the shield material with the voluminous bulking zone.

2 Claims, 5 Drawing Sheets

U.S. PATENT DOCUMENTS

| | | | |
|---|---|---|---|
| 4,904,439 A * | 2/1990 | Farrington et al. | 264/510 |
| 4,931,357 A | 6/1990 | Marshall et al. | 442/415 |
| 4,970,111 A | 11/1990 | Smith, Jr. | 428/283 |
| 5,108,678 A * | 4/1992 | Hirasaka et al. | 19/302 |
| 5,173,355 A | 12/1992 | Vock et al. | 428/219 |
| 5,200,128 A * | 4/1993 | Kiss | 264/113 |
| 5,208,105 A | 5/1993 | Ichibori et al. | 428/373 |
| 5,348,796 A | 9/1994 | Ichibori et al. | 442/202 |
| 5,350,624 A | 9/1994 | Georger et al. | 429/219 |
| 5,399,423 A | 3/1995 | McCullough et al. | 428/287 |
| 5,407,739 A | 4/1995 | McCullough et al. | 428/287 |
| 5,458,960 A | 10/1995 | Nieminen et al. | 428/284 |
| 5,508,102 A | 4/1996 | Georger et al. | 428/297 |
| 5,537,718 A * | 7/1996 | Nagatsuka et al. | 19/302 |
| 5,578,368 A | 11/1996 | Forsten et al. | 442/407 |
| 5,698,298 A | 12/1997 | Jackson et al. | 428/198 |
| 5,723,209 A | 3/1998 | Borger et al. | 428/219 |
| 5,766,745 A | 6/1998 | Smith et al. | 428/218 |
| 5,856,243 A | 1/1999 | Geirhos et al. | 442/57 |
| 5,942,288 A | 8/1999 | Kajander | 427/389.7 |
| 6,346,491 B1 | 2/2002 | DeAngelis et al. | 442/110 |
| 6,572,723 B1 | 6/2003 | Tilton et al. | 156/219 |
| 6,586,353 B1 | 7/2003 | Kiik et al. | 442/320 |
| 6,609,261 B1 | 8/2003 | Mortensen et al. | 5/698 |
| 6,718,583 B1 | 4/2004 | Diaz | 5/698 |
| 6,764,971 B2 | 7/2004 | Kelly et al. | 442/408 |
| 6,797,653 B2 | 9/2004 | Fay | 442/85 |
| 6,823,458 B1 | 11/2004 | Lee et al. | 726/16 |
| 2003/0100239 A1 | 5/2003 | Gaffney et al. | 442/354 |
| 2003/0106560 A1 | 6/2003 | Griesbach et al. | 128/849 |
| 2003/0200991 A1 | 10/2003 | Keck et al. | 134/6 |
| 2003/0224679 A1 | 12/2003 | Ahluwalia | 442/72 |
| 2003/0228460 A1 | 12/2003 | Ahluwalia | 428/315.5 |
| 2004/0060118 A1 | 4/2004 | Diaz | 5/698 |
| 2004/0060119 A1 | 4/2004 | Murphy et al. | 5/698 |
| 2004/0062912 A1 | 4/2004 | Mason et al. | 428/139 |
| 2004/0091705 A1 | 5/2004 | Hanyon et al. | 428/373 |
| 2004/0102112 A1 | 5/2004 | McGuire et al. | 442/59 |
| 2004/0106347 A1 | 6/2004 | McGuire et al. | 442/361 |
| 2004/0158928 A1 | 8/2004 | Gladney | 5/698 |
| 2004/0185731 A1 | 9/2004 | McGuire | 442/141 |
| 2004/0198125 A1 | 10/2004 | Mater et al. | 442/394 |
| 2004/0242107 A1 | 12/2004 | Collins | 442/403 |
| 2004/0242109 A9 | 12/2004 | Tilton et al. | 442/415 |
| 2004/0259451 A1 | 12/2004 | Paradis et al. | 442/381 |
| 2005/0020164 A1 * | 1/2005 | Nakamura et al. | 442/181 |
| 2005/0023509 A1 | 2/2005 | Bascom et al. | 252/608 |
| 2005/0026528 A1 | 2/2005 | Forsten et al. | 442/414 |
| 2005/0176327 A1 | 8/2005 | Wenstrup et al. | 442/357 |
| 2006/0111003 A1 | 5/2006 | Balthes | 442/327 |
| 2006/0178064 A1 | 8/2006 | Balthes et al. | 442/59 |
| 2006/0252323 A1 | 11/2006 | Cline | 442/71 |
| 2006/0264142 A1 | 11/2006 | Wenstrup et al. | 442/415 |

FOREIGN PATENT DOCUMENTS

| | | |
|---|---|---|
| EP | 1195459 | 4/2002 |
| EP | 1300511 | 4/2003 |
| JP | 59186750 | 10/1984 |
| JP | 07040487 | 2/1995 |
| JP | 7040487 | 2/1995 |
| JP | 2002287767 | 10/2002 |
| WO | WO 97/00989 | 1/1997 |
| WO | WO 01/31131 | 5/2001 |
| WO | WO 03/023108 | 2/2003 |
| WO | WO 2005/001187 | 1/2005 |

* cited by examiner

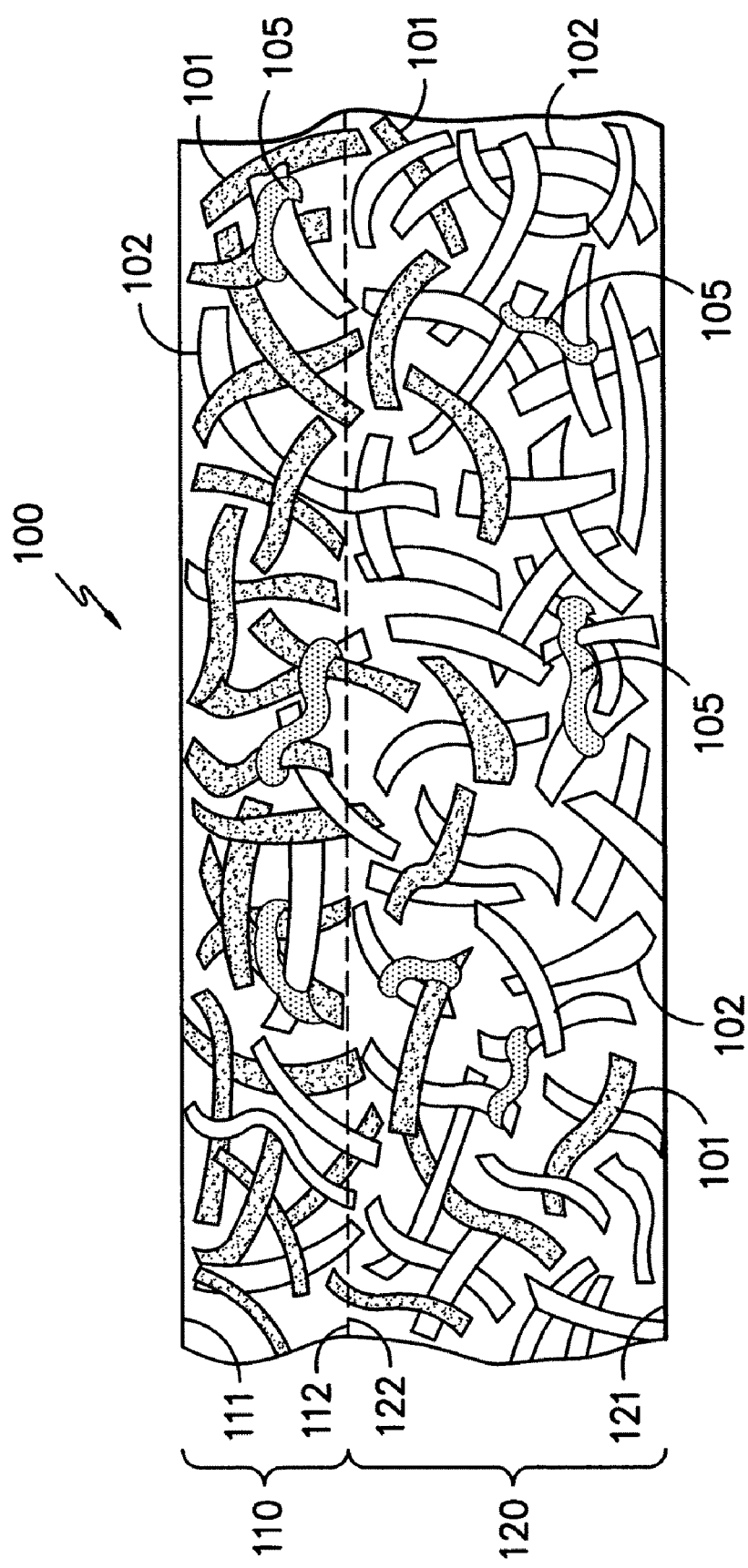
FIG. -1-

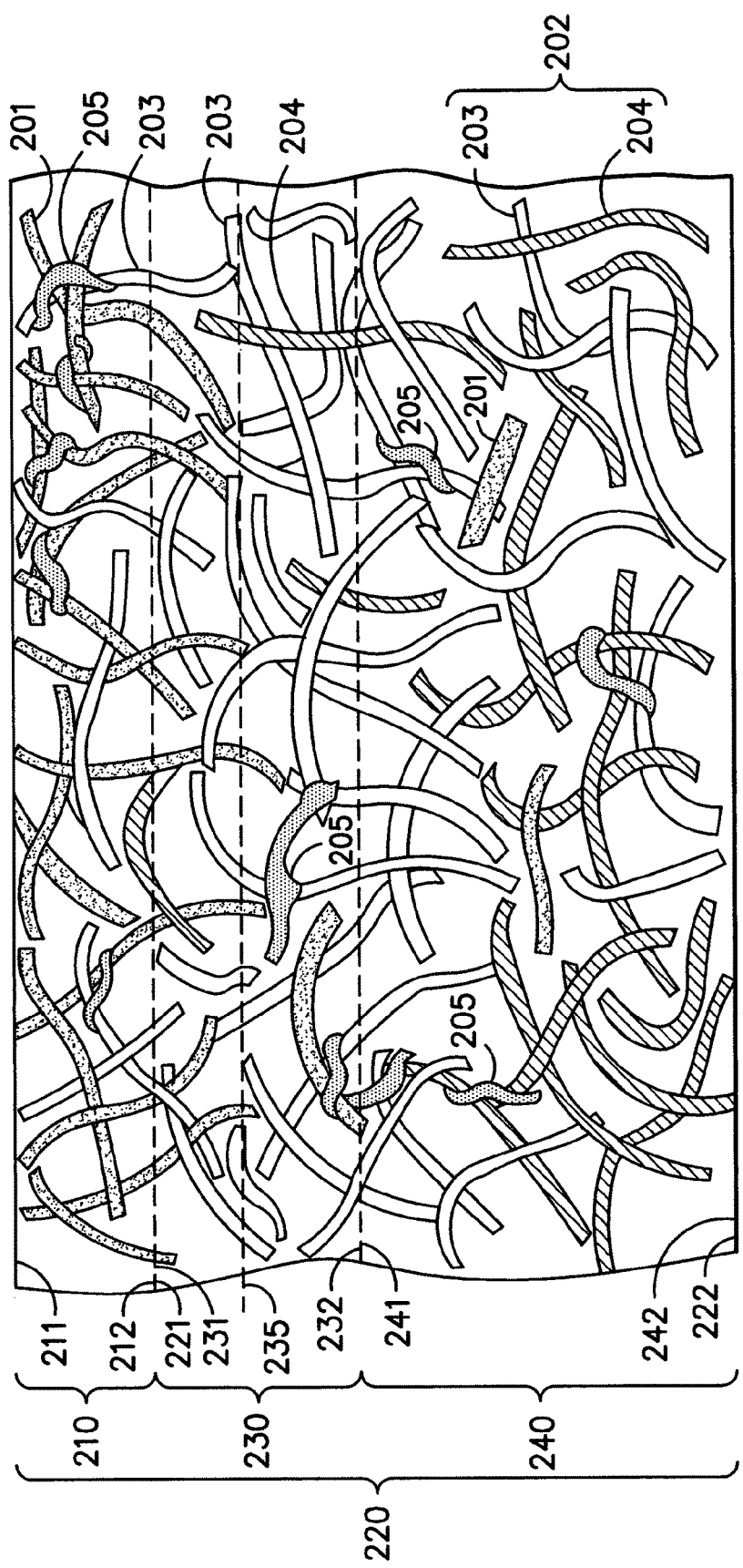
FIG. -2-

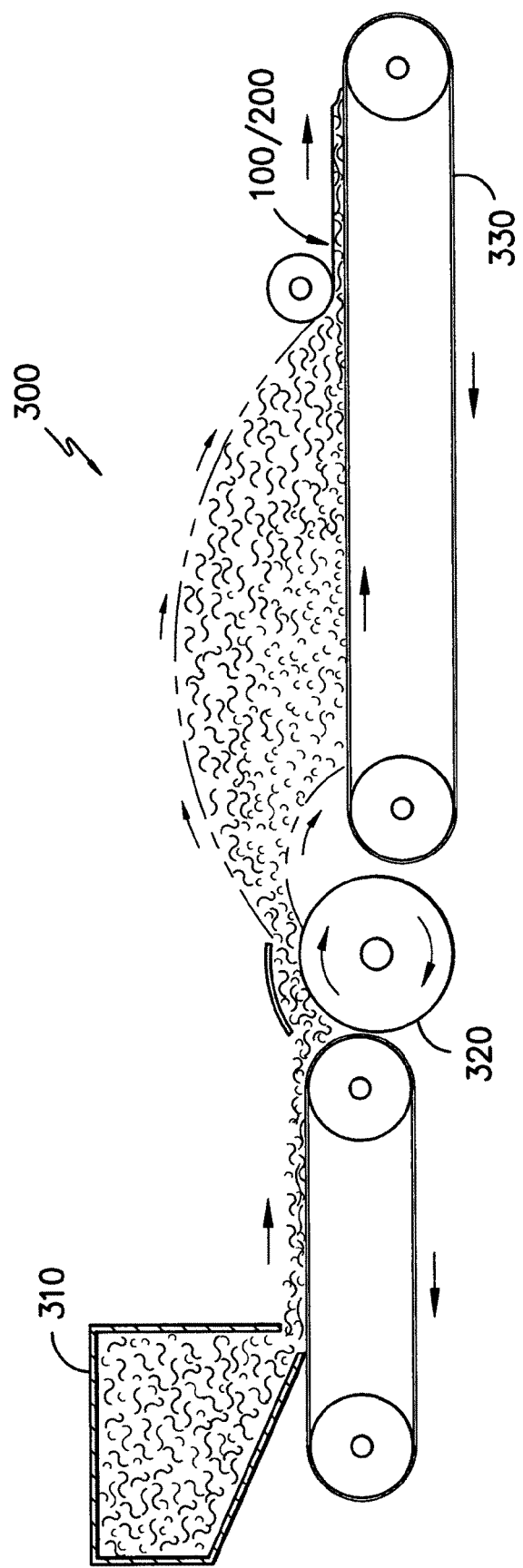
FIG. -3-

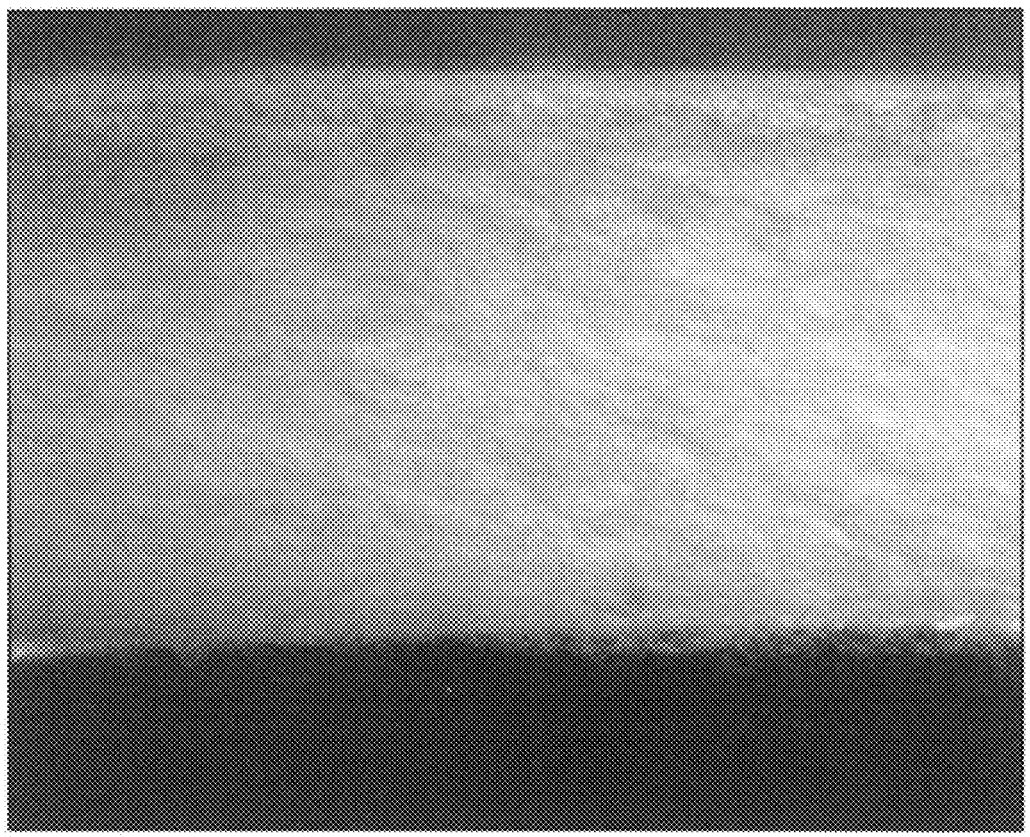
FIG. —4—

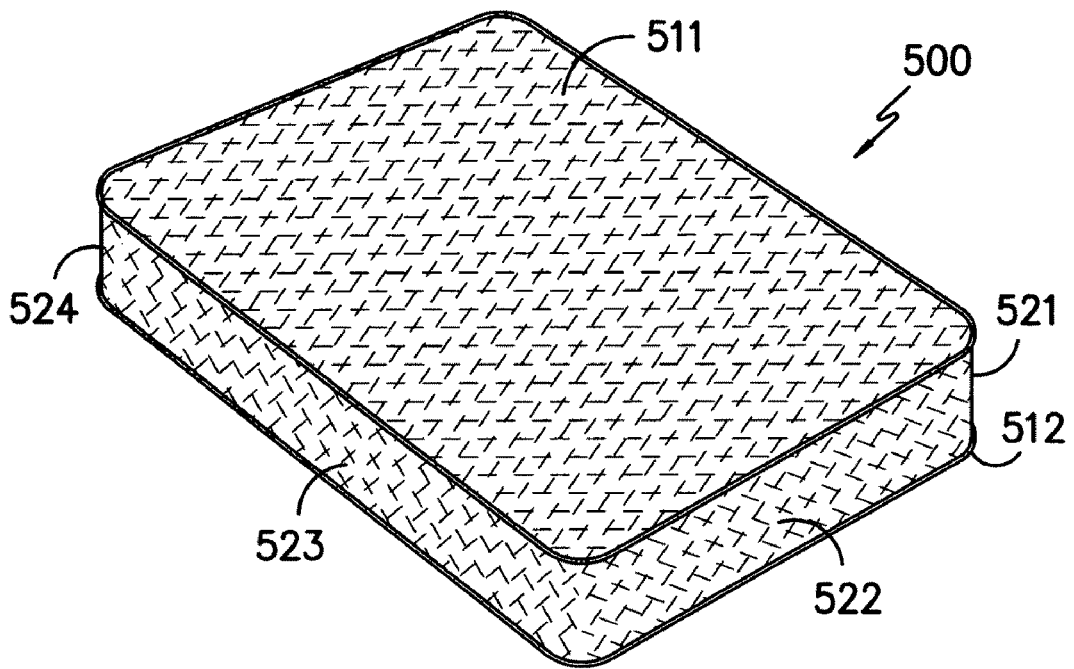
FIG. -5-
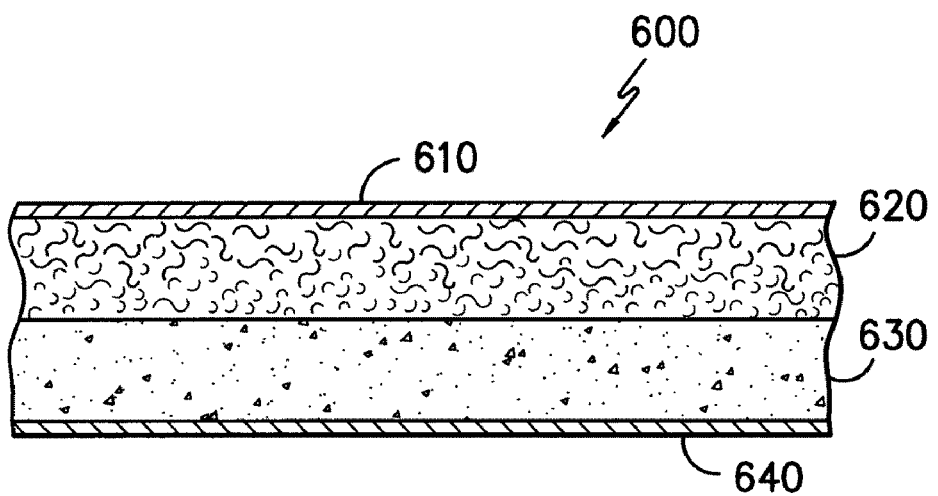
FIG. -6-

HEAT AND FLAME SHIELD

CROSS-REFERENCE TO RELATED APPLICATIONS

This application is a divisional of U.S. application Ser. No. 11/123,337 filed on May 6, 2005, now U.S. Pat. No. 7,229,938 which is a continuation-in-part of prior U.S. application Ser. No. 10/841,148 filed May 7, 2004, now U.S. Pat. No. 7,153,794 the contents of all of which are incorporated by reference herein in their entirety.

BACKGROUND

The present invention generally relates to materials for use in shielding from heat and/or flame, and in particular, heat and/or flame shielding material that can be used in applications such as hood liners for automobiles, engine compartment liners, bedding construction, upholstery, wall padding, and the like.

Numerous industries require materials which not only deliver heat and flame resistant properties, but can also provide volume, opacity, moldability, and other properties in a cost effective single substrate. Often times these barrier properties are best accomplished by using specialty materials which generate a high level of performance, but also introduce significant cost to the substrate. Especially in a voluminous substrate (high z direction thickness) even the introduction of a small percent of these materials into the shield material can introduce a significant level of cost to the overall substrate. For this reason composites having specialty surface layers are often used to provide these barrier properties. An example of a composite having specialty surface layers would be a skin laminated to a voluminous lower cost material. While this method effectively reduces the cost of the high cost raw material, there are disadvantages to this method such as additional processing steps and the potential delamination of the skin layer.

The present invention provides an alternative to the prior art by using a unitary heat shield material with different zones to provide the various desired properties of the material

BRIEF DESCRIPTION OF THE DRAWINGS

These and other features, aspects, and advantages of the present invention will become better understood with regard to the following description, appended claims, and accompanying drawings where:

FIG. 1 shows an enlarged cross-section of one embodiment of the present invention;

FIG. 2 shows an enlarged cross-sectional view of another embodiment of the present invention;

FIG. 3 shows a diagram of a machine for performing a process for forming the planar heat and flame resistant shield material of the present invention;

FIG. 4 shows a magnified cross sectional view of a shield material according to the embodiment in FIG. 1;

FIG. 5 shows a perspective view of a bed utilizing the shield material of the present invention; and, FIG. 6 shows an enlarged partial view of the walls from the bed in FIG. 5, and the shield material incorporated therein.

DETAILED DESCRIPTION

Referring now to the figures, and in particular to FIG. 1, there is shown an enlarged cross-sectional view of an embodiment of the present invention, illustrated as a planar heat and flame shield material 100. The shield material 100 may be used in its existing sheet form as a protective blanket or shield in operations such as welding, high temperature manufacturing, or the like. The shield material 100 may also be formed into parts such as automotive hood liners, engine compartment covers, and the like. Additionally, the shield material 100 can be incorporated with other materials, and/or into a structure to provide the materials and structures with additional heat and flame resistance. For example, the shield material 100 can be incorporated into the outer material of a bed, upholstery, wall padding, and other structures to provide additional flame and heat resistance to those structures. Because of the bulk associated with the shield material 100, incorporating the shield material 100 into such structures may also provide a cost benefit by replacing any bulking material in the structures.

As illustrated, the planar shield material 100 generally contains heat and flame resistant fibers 101 and bulking fibers 102. The heat and flame resistant fibers 101 and the bulking fibers 102 are staple fibers that are combined to form the shield material 100. As used herein, heat and flame resistant fibers shall mean fibers having an Limiting Oxygen Index (LOI) value of 20.95 or greater, as determined by ISO 4589-1. Types of heat and flame resistant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogentated gas. Examples of fiber suppressant fibers includes modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like. Bulking fibers are fibers that provide volume to the heat shield material. Examples of bulking fibers would include fibers with high denier per filament (one denier per filament or larger), high crimp fibers, hollow-fill fibers, and the like.

In one embodiment, the heat and flame resistant fibers 101 and the bulking fibers 102 are air-laid with a binder fiber 105. Binder fibers are fibers that form some type of adhesion or bond with the other fibers. Binder fibers can include fibers that are heat activated. An additional benefit of using a binder fiber 105 in the shield material 100 that is heat activated, is that the shield material 100 can be subsequently molded to part shapes for use in automotive hood liners, engine compartment covers, etc. Examples of heat activated binder fibers are fibers that can melt at lower temperatures, such as low melt fibers, core and sheath fibers with a lower sheath melting temperature, and the like. In one embodiment, the binder fibers are a polyester core and sheath fiber with a low melt temperature sheath.

Still referring to FIG. 1, the heat and flame resistant fibers 101 are concentrated in a heat and flame resistant zone 110 of the planar shield material 100, and the bulking fibers 102 are concentrated in a voluminous bulking zone 120 of the planar shield material 100. The heat and flame resistant zone 110 provides the shield material 100 with the primary heat and flame resistant attributes. The voluminous bulking zone 120 provides the shield material 100 with the desired z-direction thickness which extends horizontally from the planar dimension of the shield material 100. In the embodiment illustrated in FIG. 1, the heat and flame resistant zone 110 is smaller in the z-direction than the voluminous bulking zone 120.

Referring still to FIG. 1, the heat and flame resistant zone 110 has an outer boundary 111 located at the outer surface of the shield material 100, and an inner boundary 112 located adjacent to the voluminous bulking zone 120. The voluminous bulking zone 120 has an outer boundary 121 located at the outer surface of the shield material 100 and an inner boundary 122 located adjacent to the heat and flame resistant zone 110. The shield material 100 is a unitary material, and the boundaries of the two zones do not represent the delineation of layers, but areas within the unitary material. Because the shield material 100 is a unitary material, and the heat and flame resistant zone 110 and the voluminous bulking zone 120 are not discrete separate layers joined together, various individual fibers will occur in both the heat and flame resistant zone 110 and the voluminous bulking zone 120. Although FIG. 1 illustrates the heat and flame resistant zone 110 being a smaller thickness than the voluminous bulking zone 120, the relative thickness of the two zones can have a substantially different than as shown.

Referring still to FIG. 1, the heat and flame resistant zone 110 contains both the heat and flame resistant fibers 101 and the bulking fibers 102. However, the heat and flame resistant zone 110 primarily contains the heat and flame resistant fibers 101. Additionally, the distribution of the fibers in the heat and flame resistant zone 110 is such that the concentration of the heat and flame resistant fibers 101 is greater at the outer boundary 111 of the heat and flame resistant zone 110 than the inner boundary 112 of that zone. Also, as illustrated, it is preferred that the concentration of the heat and flame resistant fibers 101 decreases in a gradient along the z-axis from the outer boundary 111 of the heat and flame resistant zone 110 to the inner boundary 112 of that zone.

Still referring to FIG. 1, the voluminous bulking zone 120 contains both the heat and flame resistant fibers 101 and the bulking fibers 102. However, the voluminous bulking zone 120 primarily contains the bulking fibers 102. Additionally, the distribution of the fibers in the voluminous bulking zone 120 is such that the concentration of the bulking fibers 102 is greater at the outer boundary 121 of the voluminous bulking zone 120 than the inner boundary 122 of that zone. Also, as illustrated, it is preferred that the concentration of the bulking fibers 102 decreases in a gradient along the z-axis from the outer boundary 121 of the voluminous bulking zone 120 to the inner boundary 122 of that zone.

Referring now to FIG. 2, there is shown an enlarged cross-sectional view of another embodiment of the present invention, illustrated as a heat and flame shield material 200. As illustrated, the shield material 200 generally contains heat and flame resistant fibers 201 and bulking fibers 202. The heat and flame resistant fibers 201 and the bulking fibers 202 are staple fibers that are combined to form the shield material 200. In one embodiment, the heat and flame resistant fibers 201 and the bulking fibers 202 are air-laid with a binder fiber 205. When the binder fiber 205 is a heat activated binder fiber, the combination of fibers is heated to activate the binder fiber 205 for bonding together the fibers of the shield material 200. An additional benefit of using a heat activated binder fiber as the binder fiber 205 in the shield material 200 is that the shield material 200 can be subsequently molded to part shapes for use in automotive hood liners, engine compartment covers, etc.

Still referring to FIG. 2, the heat and flame resistant fibers 201 are concentrated in a heat and flame resistant zone 210 of the shield material 200, and the bulking fibers 202 are concentrated in a voluminous bulking zone 220 of the shield material 200. The heat and flame resistant zone 210 provides the shield material 200 with the primary heat and flame resistant attributes of the shield material 200. The voluminous bulking zone 220 provides the shield material 200 with the desired z-direction thickness. In the embodiment illustrated in FIG. 2, the heat and flame resistant zone 210 is smaller in the z-direction than the voluminous bulking zone 220.

Referring still to FIG. 2, the heat and flame resistant zone 210 has an outer boundary 211 located at the outer surface of the shield material 200, and an inner boundary 212 located adjacent to the voluminous bulking zone 220. The voluminous bulking zone 220 has an outer boundary 221 located at the outer surface of the shield material 200 and an inner boundary 222 located adjacent to the heat and flame resistant zone 210. The shield material 200 is a unitary material, and the boundaries of the two zones do not represent the delineation of layers, but areas within the unitary material. Because the shield material 200 is a unitary material, and the heat and flame resistant zone 210 and the voluminous bulking zone 220 are not discrete separate layers joined together, various individual fibers will occur in both the heat and flame resistant zone 210 and the voluminous bulking zone 220. Although FIG. 2 illustrates the heat and flame resistant zone 210 being a smaller thickness than the voluminous bulking zone 220, the relative thickness of the two zones can have a substantially different than as shown.

Still referring to FIG. 2, the heat and flame resistant zone 210 contains both the heat and flame resistant fibers 201 and the bulking fibers 202. However, the heat and flame resistant zone 210 primarily contains the heat and flame resistant fibers 201. Additionally, the distribution of the fibers in the heat and flame resistant zone 210 is such that the concentration of the heat and flame resistant fibers 201 is greater at the outer boundary 211 of the heat and flame resistant zone 210 than the inner boundary 212 of that zone. Also, as illustrated, it is preferred that the concentration of the heat and flame resistant fibers 201 decreases in a gradient along the z-axis from the outer boundary 211 of the heat and flame resistant zone 210 to the inner boundary 212 of that zone.

Referring still to FIG. 2, the bulking fibers 202 of the shield material 200 comprise first bulking fibers 203 and second bulking fibers 204. In one embodiment, the first bulking fibers have a higher denier per filament, and/or mass per fiber, than the heat and flame resistant fibers 201, and the second bulking fibers 204 have a higher denier per filament, and/or mass per fiber, than the first bulking fiber 203 and the heat and flame resistant fibers 201. Also, the voluminous bulking zone 220 is divided into a first bulking zone 230 and a second bulking zone 240. The first bulking zone 230 has an outer boundary 231 located adjacent to the heat and flame resistant zone 210 and inner boundary 232 located adjacent to the second bulking zone 240. The second bulking zone 240 has an outer boundary 241 located adjacent to the outer surface of the shield material 200 and an inner boundary 242 located adjacent to the first bulking zone 230. As previously stated, the shield material 200 is a unitary material, and as such, the boundaries of the two bulking zones do not represent the delineation of layers, but areas with in the unitary material. Because the shield material 200 is a unitary material, and the first bulking zone 230 and the second bulking zone 240 are not discrete separate layers joined together, various individual bulking fibers will occur in both the first bulking zone and the second bulking zone 240. Although FIG. 2 illustrates the heat and flame resistant zone 210 being a smaller thickness than the voluminous bulking zone 220, the relative thickness of the two zones can have a substantially different than as shown.

Still referring to FIG. 2, the first bulking zone 230 contains both the first bulking fibers 203 and the second bulking fibers 204. However, the first bulking zone 230 will contain more of the first bulking fibers 203 than the second bulking fibers 204. The distribution of the fibers in the first bulking zone 230 is such that the concentration of the first bulking fibers 203 increases in a gradient along the z direction from the outer boundary 231 of the first bulking zone 230 to a first bulking fiber concentration plane 235 located between the inner boundary 232 and the outer boundary of the first bulking zone. Also, as illustrated, it is preferred that the concentration of the first bulking fibers 203 decreases in a gradient along the z-axis from the first bulking fiber concentration plane 235 to the inner boundary 232 of that zone.

Referring still to FIG. 2, the second bulking zone 240 contains both the first bulking fibers 203 and the second bulking fibers 204. However, the second bulking zone 240 will contain more of the second bulking fibers 204 than the first bulking fibers 203. The distribution of the fibers in the second bulking zone 230 is such that the concentration of the second bulking fibers 204 is greater at the outer boundary 241 of the second bulking zone 240 than the inner boundary 242 of that zone. Also, as illustrated, it is preferred that the concentration of the second bulking fibers 204 decreases in a gradient along the z-axis from the outer boundary 241 of the second bulking zone 240 to the inner boundary 242 of that zone.

Still referring to FIG. 2, the first bulking zone 230 will also contain heat and flame resistant fibers 201. However, the first bulking zone 230 will contain more of the first bulking fibers 203 than the heat and flame resistant fibers 201. The heat and flame resistant zone 210 can have some amount of the second bulking fiber 204; however, the amount of second bulking fiber 204 in the heat and flame resistant zone 210 is significantly lower than the first bulking fibers 203. The second bulking zone 240 can also have some amount of the heat and flame resistant fibers 201; however, the amount of the heat and flame resistant fibers 201 in the second bulking zone 240, if any, is significantly lower than the first bulking fibers 203. An advantage of using the two distinct bulking fibers 203/204 (FIG. 2) over using a single bulking fiber 102 (FIG. 1), is that for the same respective weights of heat and flame resistant fibers 101/201 and voluminous bulking fibers 102/202, a shield material 200 having two types of bulking fibers 203 and 204 will have fewer heat and flame resistant fibers 201 located in the voluminous bulking zone 120/220 than a shield material 100 having only one type of bulking fiber 102.

Referring now to FIGS. 1 and 2, it is contemplated that the shield material 100/200 can include additional fibers that create additional zones extending outward from the bulking zone 120/220. In such embodiments, the outer boundary 121/221/241 of the bulking zone 120/220 will not be adjacent to the exterior of the shield material 100/200, but will be disposed in the interior of the shield material 100/200. The additional zones will also have an area of transition in the concentration of the bulking fibers 102/204 to the additional fibers, similar to the transition of the first bulking fibers 203 to the second bulking fibers 204 in the shield material 200. Multiple additional zones can be created with multiple additional fibers, resulting in many additional zones. In the outer most additional zone, the fibers creating that outer most additional zone will be concentrated at the exterior of the shield material 100/200 similar to the bulking fibers 102 and 204 as shown in FIGS. 1 and 2.

Referring now to FIG. 3, there is shown a diagram of a particular piece of equipment 300 for the process to form the planar unitary heat and flame shield from FIGS. 1 and 2. A commercially available piece of equipment that has been found satisfactory in this process to form the claimed invention is the "K-12 HIGH-LOFT RANDOM CARD" by Fehrer AG, in Linz, Austria. The heat and flame resistant fibers 101/201 and the voluminous bulking fibers 102/202 are opened and blended in the appropriate proportions and enter an air chamber 310. In an embodiment using the binder fibers 105/205, the binder fibers 105/205 are also opened and blended with the heat and flame resistant fibers 101/201 and the bulking fibers 102/202 prior to introduction into the air chamber 310. In an embodiment where the voluminous bulking fibers 202 contain multiple types of bulking fibers 203/204, those multiple types of bulking fibers 203/204 are also opened and blended in the appropriate portions with the other fibers before introduction into the air chamber 310. The air chamber 310 suspends the blended fibers in air, and are expelled for delivery to an air lay machine that uses a cylinder 320. The cylinder 320 rotates and slings the blended fibers towards a collection belt 330. The spinning rotation of the cylinder 320 slings the heavier fibers a further distance along the collection belt 330 than it slings the lighter fibers. As a result, the mat of fibers collected on the collection belt 330 will have a greater concentration of the lighter fibers adjacent to the collection belt 330, and a greater concentration of the heavier fibers further away from the collection belt 330. In general, the larger the difference in denier between the fibers, the greater the gradient will be in the distribution of the fibers.

In the embodiment of the shield 100 illustrated in FIG. 1, the heat and flame resistant fibers 101 are lighter than the voluminous bulking fibers 102. Therefore, in the process illustrated in FIG. 3, the heat and flame resistant fibers 101 collect in greater concentration near the collection belt 330, and the voluminous bulking fibers 102 collect in greater concentration away from the collection belt 330. It is this distribution by the equipment 300 that creates the heat and flame resistant zone 110 and the voluminous bulking zone 120 of the planar unitary shield material 100.

In the embodiment of the shield 200 illustrated in FIG. 2, the heat and flame resistant fibers 201 are lighter than the voluminous bulking fibers 202. Therefore, in the process illustrated in FIG. 3, the heat and flame resistant fibers 201 collect in greater concentration near the collection belt 330, and the voluminous bulking fibers 202 collect in greater concentration away from the collection belt 330. It is this distribution by the equipment 300 that creates the heat and flame resistant zone 210 and the voluminous bulking zone 220 of the planar unitary shield material 200. Additionally, the first bulking fibers 203 of the voluminous bulking fibers 220 are lighter than the second bulking fibers 204. Therefore, in the process illustrated in FIG. 3, the first bulking fibers 203 are collected in greater concentration nearer the collection belt 330 than the second bulking fibers 204. It is this distribution that creates the first bulking zone 230 and the second bulking zone 240 of the voluminous bulking zone 220 of the planar unitary shield material 200.

In formation of the shield material 100/200, the combined percentage of heat and flame resistant fibers can range from about 10% by total weight, to about 90% by total weight. The combined percentage of bulking fibers in the shield material 100/200 can range from about 80% by total weight, to about 5% by total weight. An optimum amount of binder fibers in the shield material 100/200 can range from about 10% by total weight to about 40% by total weight. It has been found that a high loft shield material provides a desirable product for quilting with other materials to use in applications such as mattress borders and panels. The combination of bulking fibers with the heat and flame resistant fibers in the present process reduces costs by reducing steps and gives better performance than combining two separate layers of the materials for criteria such as de-lamination. Additionally, the performance of the shield material appears to have better flame resistance for the same cost, and a lower cost for similar performance.

In a first example of the present invention, planar unitary heat and flame resistant shield material was formed from a blend of four fibers including:
1) 4% by weight of a heat and flame resistant fiber being 2 dpf partially oxidized polyacrylonitrile
2) 25% by weight of a first bulking fiber being 6 dpf polyester
3) 41% by weight of a second bulking fiber being 15 dpf polyester, and
4) 30% by weight of a low melt binder fiber being 4 dpf core sheath polyester with a lower melting temperature sheath.

The fibers were opened, blended and formed into a shield material using a "K-12 HIGH-LOFT RANDOM CARD" by Fehrer AG. The shield had a weight per square yard of about 16-32 ounces and a thickness in the range of about 12-37 mm. In the resulting shield material, the heat and flame resistant fibers in the heat and flame resistant zone comprised at least 70% of the total fibers in that zone, and the heat and flame resistant fibers in the voluminous bulking zone were less than about 2% of the total fibers in that zone.

In a second example of the present invention, planar unitary heat and flame resistant shield material was formed from a blend of four fibers including:
1) 40% by weight of a heat and flame resistant fiber being about 3.2 dpf Visil®
2) 20% by weight of about 2 dpf modacrylic(Kanecaron™)
3) 20% by weight of a bulking fiber being 15 dpf polyester, and
4) 20% by weight of a low melt binder fiber being 4 dpf core sheath polyester with a lower melting temperature sheath.

The fibers were opened, blended and formed into a shield material using the "K-12 HIGH-LOFT RANDOM CARD" by Fehrer AG. The shield had a weight per square yard of about 8 ounces and a thickness in the range of about 25 mm. In the resulting shield material, the heat and flame resistant fibers in the heat and flame resistant zone comprised at least 60% of the total fibers in that zone, and the heat and flame resistant fibers in the voluminous bulking zone were less than about 40% of the total fibers in that zone. In an alternate version of the second example, the low melt binder fiber was a 10 dpf core sheath polyester with a lower melting temperature sheath.

In a third example of the present invention, planar unitary heat and flame resistant shield material was formed from a blend of four fibers including:
1) 30% by weight of a heat and flame resistant fiber being about 3.2 dpf Visil®
2) 30% by weight of about 2 dpf modacrylic (Kanecaron™)
3) 20% by weight of a bulking fiber being 15 dpf polyester, and
4) 20% by weight of a low melt binder fiber being 4 dpf core sheath polyester with a lower melting temperature sheath.

The fibers were opened, blended and formed into a shield material using the "K-12 HIGH-LOFT RANDOM CARD" by Fehrer AG. The shield had a weight per square yard of about 8 ounces and a thickness in the range of about 25 mm. In the resulting shield material, the heat and flame resistant fibers in the heat and flame resistant zone comprised at least 60% of the total fibers in that zone, and the heat and flame resistant fibers in the voluminous bulking zone were less than about 40% of the total fibers in that zone.

In a fourth example of the present invention, planar unitary heat and flame resistant shield material was formed from a blend of four fibers including:
1) 40% by weight of a heat and flame resistant fiber being about 3.2 dpf Visil®
2) 40% by weight of about 2 dpf modacrylic (Kanecaron™)
3) 15% by weight of a bulking fiber being 15 dpf polyester, and
4) 5% by weight of a low melt binder fiber being 4 dpf core sheath polyester with a lower melting temperature sheath.

The fibers were opened, blended and formed into a shield material using the "K-12 HIGH-LOFT RANDOM CARD" by Fehrer AG. The shield had a weight per square yard of about 10 ounces and a thickness in the range of about 25 mm. In the resulting shield material, the heat and flame resistant fibers in the heat and flame resistant zone comprised at least 60% of the total fibers in that zone, and the heat and flame resistant fibers in the voluminous bulking zone were less than about 40% of the total fibers in that zone.

In a fifth example of the present invention, planar unitary heat and flame resistant shield material was formed from a blend of four fibers including:
1) 50% by weight of a heat and flame resistant fiber being 2 dpf panox
2) 30% by weight of a bulking fiber being 15 dpf polyester, and
3) 20% by weight of a low melt binder fiber being 4 dpf core sheath polyester with a lower melting temperature sheath.

The fibers were opened, blended and formed into a shield material using the "K-12 HIGH-LOFT RANDOM CARD" by Fehrer AG. The shield had a weight per square yard of about 6 ounces and a thickness in the range of about 25 mm. In the resulting shield material, the heat and flame resistant fibers in the heat and flame resistant zone comprised at least 60% of the total fibers in that zone, and the heat and flame resistant fibers in the voluminous bulking zone were less than about 40% of the total fibers in that zone.

Referring now to FIG. 4, there is shown an enlarged cross sectional view of an embodiment of the shield material 100 from FIG. 1 formed according to the method disclosed with reference to FIG. 3. FIG. 4 illustrates the heat and flame resistant zone above the bulking zone. As can be seen, the fibers have an orientation with the mode of the angle being at approximately 30 degrees, which is most pronounced in the bulking zone. The angle of the fibers are a result of the manufacturing process, and give the shield material a stiffness and resiliency. The mode of the angle for the fibers can vary from about 5 degrees to about 80 degrees towards the horizontal z-direction from the planar dimensions of the shield material 100.

Referring now to FIG. 5, there is shown a mattress incorporating the shield material 100/200. The mattress 500 includes a first side 511, an opposing second side 512, and at least one of side walls 521, 522, 523, and 524 connecting the first side 511 and the second side 512. Illustrated in FIG. 6 is a partial cutaway view of a wall 600 used for the sides 511, 512, or walls 521, 522, 523, and 524 of the mattress 500 in FIG. 5. As illustrated, the wall 600 includes an exterior ticking material 610, a shield material 620, a support material 630, and a backing material 640. The shield material 100/200 described above in reference to FIGS. 1-4, can be used as the shield material 620 in the wall 600 and is preferably oriented with the heat and flame resistant zone nearest to the exterior ticking material 610. The support material 630 is a resilient material such as foam, nonwoven, or the like. The backing material 640 is a flexible material such as a woven, knitted, or nonwoven textile.

Although the present invention has been described in considerable detail with reference to certain preferred versions thereof, other versions are possible. For example, an additional layer of material such as a nonwoven can be added to the outside surface or the inside surface of the present invention for additional purposes. Therefore, the spirit and scope of the appended claims should not be limited to the description of the preferred versions contained herein.

What is claimed is:

1. A method of forming a shield material comprising the steps of blending a plurality of heat and flame resistant fibers having a first denier with a plurality of bulking fibers having a second denier being greater than the first denier of the heat and flame resistant fibers and a plurality of binder fibers, and projecting the blended heat and flame resistant fibers, binder fibers, and the bulking fibers along a moving belt such that a unitary nonwoven material is formed on the belt with a heat and flame resistance zone and a bulking zone, whereby the heat and flame resistance zone includes a greater percentage of the heat and flame resistant fibers than the bulking fibers and the bulking zone includes a greater percentage of the bulking fibers than the heat and flame resistant fibers.

2. The method according to claim 1, wherein the step of blending fibers includes the bulking fibers comprising a first bulking fiber and a second bulking fiber, the second bulking fiber having a greater denier than the first bulking fiber.

* * * * *